United States Patent
He et al.

(10) Patent No.: US 9,521,021 B2
(45) Date of Patent: *Dec. 13, 2016

(54) ADAPTIVE BACKCHANNEL EQUALIZATION

(71) Applicant: Intel Corporation, Santa Clara, CA (US)

(72) Inventors: Yun He, Santa Clara, CA (US); Sanjib Sarkar, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/859,339

(22) Filed: Sep. 20, 2015

(65) Prior Publication Data

US 2016/0080179 A1    Mar. 17, 2016

Related U.S. Application Data

(63) Continuation of application No. 13/897,947, filed on May 20, 2013, now Pat. No. 9,143,369.

(60) Provisional application No. 61/801,014, filed on Mar. 15, 2013.

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC ... *H04L 25/03878* (2013.01); *H04L 25/03343* (2013.01)

(58) Field of Classification Search
CPC ................. H04L 25/03057; H04L 25/03885; H04B 17/0085
See application file for complete search history.

(56) References Cited

U.S. PATENT DOCUMENTS

| | | |
|---|---|---|
| 9,143,369 B2 | 9/2015 | He et al. |
| 2006/0034358 A1 | 2/2006 | Okamura |
| 2006/0158225 A1 | 7/2006 | Stojanovic et al. |
| 2008/0056344 A1 | 3/2008 | Hidaka |
| 2010/0207196 A1 | 8/2010 | Shin et al. |
| 2010/0290515 A1 | 11/2010 | Dai et al. |
| 2010/0329325 A1 | 12/2010 | Mobin et al. |
| 2011/0222594 A1 | 9/2011 | Zerbe et al. |

(Continued)

FOREIGN PATENT DOCUMENTS

| | | |
|---|---|---|
| EP | 2107746 | 10/2009 |
| KR | 2005-0037813 | 4/2005 |

OTHER PUBLICATIONS

European Patent Office Extended Supplementary Search Report in EP Application Serial No. 14159597.5 mailed on Aug. 29, 2014 (6 pages).

(Continued)

*Primary Examiner* — Shuwang Liu
*Assistant Examiner* — Sung Ahn
(74) *Attorney, Agent, or Firm* — Patent Capital Group

(57) ABSTRACT

Techniques for adaptive backchannel equalization. A total equalization value is determined over a preselected training period. A total balance equalization value is determined over the preselected training period. A transmitter equalization coefficient is determined based on the total equalization value and the total balance equalization value. Data is transmitted over a serial link using the transmitter equalization coefficient.

20 Claims, 12 Drawing Sheets

(56) References Cited

U.S. PATENT DOCUMENTS

| 2011/0299585 A1 | 12/2011 | Tomita et al. |
| 2012/0207196 A1 | 8/2012 | Zerbe et al. |
| 2012/0207204 A1 | 8/2012 | Hidaka |
| 2013/0148712 A1 | 6/2013 | Malipatil et al. |
| 2014/0092952 A1 | 4/2014 | Aguilar-Arreola et al. |
| 2014/0153620 A1 | 6/2014 | Longo et al. |
| 2014/0269881 A1 | 9/2014 | He et al. |

OTHER PUBLICATIONS

Korean Patent Office Notice of Preliminary Rejection in Korean Patent Application Serial No. 2014-0030598 mailed on Jun. 15, 2015.

Korean Patent Office Notice of Allowance in Korean Patent Application Serial No. 2014-0030598 mailed on Dec. 8, 2015.

Timing sequence of adaptive equalization

Data pattern analysis for adaptive equalization

FIG. 5

ADAPTIVE BACKCHANNEL EQUALIZATION

CROSS REFERENCE TO RELATED APPLICATIONS

This application is a continuation (and claims the benefit of priority under 35 U.S.C. §120) of U.S. patent application Ser. No. 13/897,947, filed on May 20, 2013, entitled ADAPTIVE BACKCHANNEL EQUALIZATION, which application claims the benefit of priority to U.S. Provisional Patent Application Ser. No. 61/801,014, entitled ADAPTIVE BACKCHANNEL EQUALIZATION filed on Mar. 15, 2013. The disclosures of the prior applications are considered part of and are hereby incorporated by reference in their entirety in the disclosure of this application.

TECHNICAL FIELD

Embodiments of the invention relate to high-speed interconnections. More particularly, embodiments of the invention relate to high-speed serial links and associated transmitter control.

BACKGROUND

High-speed serial input/output (I/O) interfaces have recently been targeting 8-10 Gbit speeds. Providing reliable data communications at these speeds is often complex and challenging as inter-symbol interference (ISI), random and deterministic jitter, crosstalk and supply noise can severely degrade the signal, which results in challenges to recover the signal on the receiver side. In the PCIe, (Generation 3) specification, for example, an interactive back channel equalization protocol is defined. This protocol allows link partners to exchange information and allocates a time window for each receiver to adjust its link partner's transmitter settings. However, the protocol does not specify a method for the receiver to adapt, but the transmitter side of the link partner must respond to its request.

Current solutions for utilizing link equalization require every platform and add-in card to be characterized and configured individually for reliable operation. This combined with individual platform customization represents a huge logistics challenge for electrical validation.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 is an example equalization map.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

One current solution for providing adaptive link equalization is to perform a receiver eye margin test based transmitter optimization. It goes through every equalization setting of the transmitter and tests the receiver margin by utilizing the time margin and/or voltage margin Design for Test (DFT) functions. After the eye margin testing exhaustively goes through all the link partner's transmitter equalization settings, it selects the transmitter equalization corresponding to the highest margin obtained during the test. The eye margin test based transmitter optimization is typically run by BIOS during system power up, but can also be integrated into a PCIe controller or system agent. It can be referred to as "software equalization" and has many drawbacks. These drawbacks include one or more of the following.

Eye margin based transmitter optimization significantly increases boot time because it requires a complete set of margin tests against a link partner's transmitter equalization setting. Because this is performed during power up, it represents a negative impact on the user experience. Eye margin based transmitter optimization does not yield the same result for each run. The reliability of the margin test is directly related to the dwell time in which the receiver adds additional stress in time and/or voltage while checking for the bit error rate. To obtain reliable results, the full margin test can take several minutes to complete.

Eye margin based transmitter optimization requires an add-in card to advertise PCIe Gen 3 compliance during power up and provide an additional reset signal. These additional requirements can cause system interoperability issues. Eye margin based transmitter optimization may select settings that introduce system stability risk. Eye margin based transmitter optimization only looks at margin and has no knowledge of internal receiver status. It could pick the setting that put a receiver close to a boundary condition of stability cliff for internal circuits.

Eye margin based transmitter optimization only selects from different presets, which limits link performance improvement. The presets are just a small portion of the possible equalization settings and optimal settings are platform dependent, which may not correspond with the presets. Many receiver analog settings are heavily dependent on the process, operating temperature and voltage. Adding new receiver parameters into the eye margin tests exponentially increase the optimization time and not practical in real world systems. Lacking the capability of self-adjusting receiver configuration is another limitation to the link performance improvement.

Figure 1:
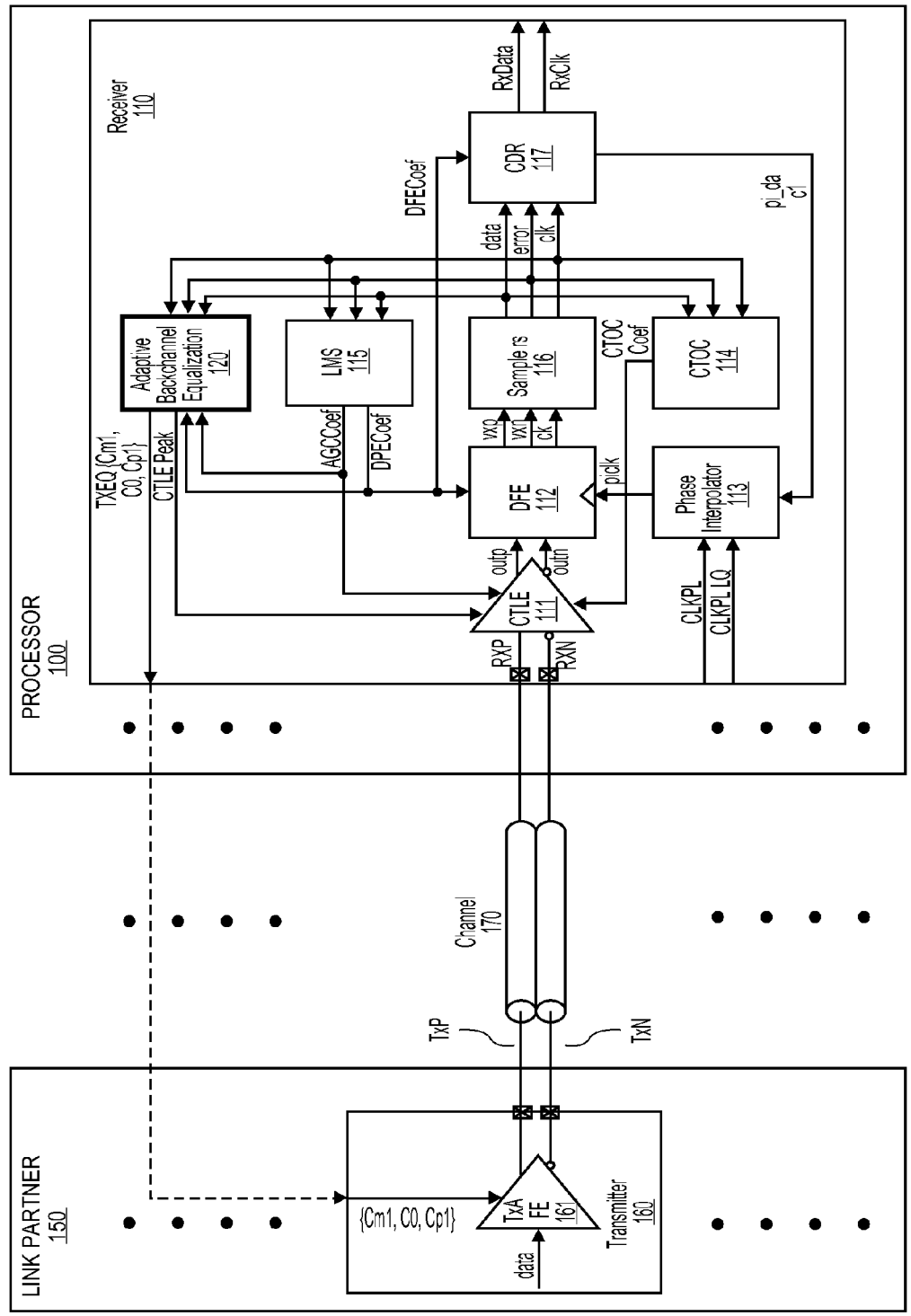
FIG. 1 is a block diagram of one embodiment of a computer system with links that can utilize adaptive backchannel equalization.

FIG. 1 is a block diagram of one embodiment of a computer system with links that can utilize adaptive backchannel equalization. In one embodiment, the links are PCIe-compliant links, for example, PCIe, Generation 3 or later compliant links. The computer system in this example consists of processor 100, link partner 150 and channel 170. In one embodiment, link partner 150 includes PCIe Gen3 compliant transmitter 160. In one embodiment, transmitter 160 implements 3-tap equalization FIR filter in transmitter analog front end (TxAFE) block 161. The 3-tap FIR filter is controlled by TX equalization coefficients {Cm1, C0, and Cp1} respectively. Cm1 is the pre-cursor tap, C0 is the main cursor tap and Cp1 is the post-cursor tap. Transmitter 160 converts the binary data stream into differential analog signals, and equalizes the outputs TXP and TXN, according to coefficients {Cm1, C0, and Cp1}. The transmit signals are connected to channel 170.

In one embodiment, processor 100 implements a PCIe Gen3 receiver 110. The attenuated and degraded signals RXP and RXN from channel outputs are coupled to receiver 110. Continuous time linear equalizer (CTLE) block 111 amplifies and conditions the input signals. CTLE 111 has a variable gain amplifier that receives an automatic gain control coefficient (AGCCoef), and a frequency peaking equalizer that receives a CTLEPeak coefficient (CTLE-Peak). CTLE 111 provides a stabilized differential signal on outputs outp, outn to a decision feedback equalizer (DFE) block 112. DFE 112 is adjusted by a decision feedback equalizer coefficient (DFECoef).

Once the differential signal has been compensated by DFE 112, it is provided to samplers block 116 for sampling digital data and errors. Samplers 116 operate to determine whether DFE output signal vxp, vxn, is above or below a reference, such as a reference voltage, at the rising or falling edges of the clock signal ck.

In one embodiment, if the DFE voltage is above zero, it corresponds to a digital data "1". If the DFE voltage is below zero, it corresponds to a digital data "0". If the magnitude of the DFE voltage is above a reference voltage level, (e.g. vref) such as, for example, 100 mV, 150 mV, or other selected value, it corresponds to a digital error "1". If the magnitude of the DFE voltage is below the same reference voltage level, it corresponds to a digital error "0". The logic levels for the data and error information may be reversed in various embodiments or encoded in various schemes such that at different times, the logic levels are reversed.

The data and error signals are provided to least mean square (LMS) error block 115 and continuous time offset cancellation (CTOC) block 114, which provide the decision feedback equalizer coefficient (DFECoef), automatic gain control coefficient (AGCCoef), and CTLE offset correction coefficient (CTOCCoef) to DFE 112 and CTLE 111 respectively. The DFECoef, data and error signals are provided to a clock and data recovery (CDR) block 117, which generates the receiver data and clock outputs RxData and RxClk, and extracts sampling phase information pi_dac1 to control phase interpolator block 113. The phase interpolator mixes the input PLL clocks CLKPLLI and CLKPLLQ according to pi_dac1, and generates piclk output to DFE block 112.

In one embodiment, an adaptive backchannel equalization block 120 analyzes the data and error signals, along with AGCCoef and DFECoef during initial link training With the techniques described herein, backchannel equalization can utilize adaptive tuning in hardware to select transmitter equalization settings {Cm1, C0, and Cp1} that are optimal for the receiver. In one embodiment, the technique includes selecting a continuous time linear equalizer (CTLE) peaking adaptively through hardware adaptation. One embodiment enables implementation of a hardware adaptation that satisfies the requirements of PCIe, Gen. 3 on back channel equalization. In one embodiment, this technique uses gradient search strategies for fast convergence. In general, it can be adopted to any receiver with a decision feedback equalizer (DFE).

The techniques described herein may provide one or more of the following advantages. In one embodiment, both transmitter equalization coefficients and receiver CTLE peaking settings are jointly optimized, which are two of the most critical parameters in link performance. It can improve electrical robustness. The higher the electrical margin the better the link stability. In on embodiment, the mechanisms described herein require a relatively small footprint and can fit within PCIe Gen 3 designs.

In one embodiment, the technique described herein can run on a per-lane basis and can optimize over the whole equalization space for each lane. In contrast, eye margin based transmitter optimization is per-bundle (two lanes) or per-port (all lanes), and can only select among presets for the bundle or port.

Figure 2:
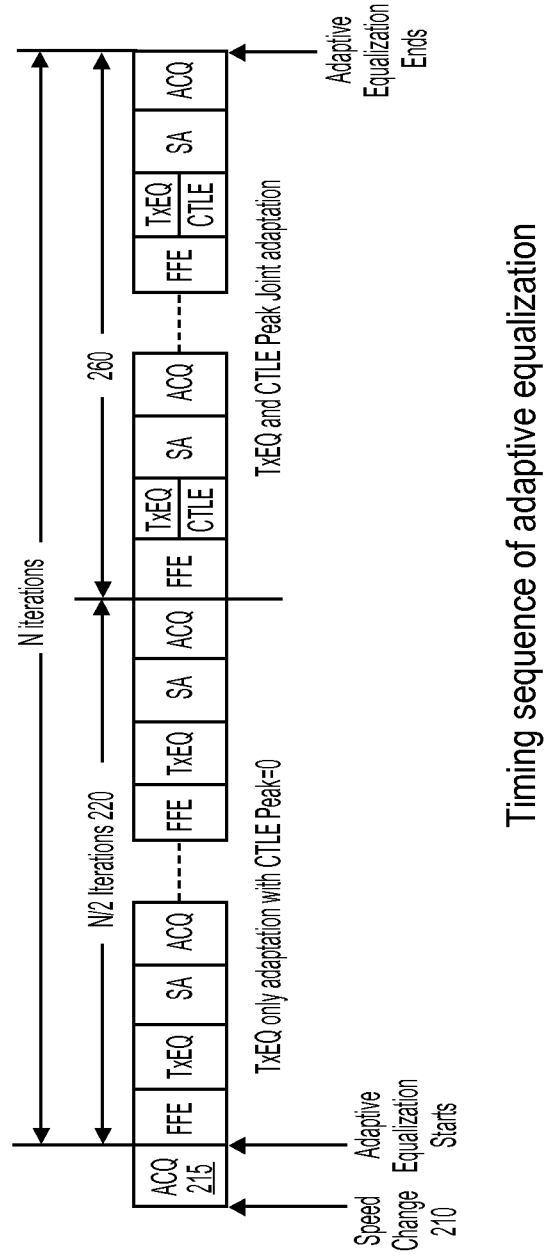
FIG. 2 is a timing sequence corresponding to one embodiment of an adaptive equalization process.

FIG. 2 is a timing sequence corresponding to one embodiment of an adaptive equalization process. In one embodiment, adaptive equalization can be provided by a digital finite state machine (FSM) that resides in an analog front end (AFE). In one embodiment, the FSM controls receiver circuits, calculates optimized equalization settings, and communicates with I/O (e.g., PCIe) system agents (SA) or controllers during training. The example of FIG. 2 relates to PCIe training; however, the techniques described herein can be applied to different interfaces and are not limited to PCIe.

In one embodiment, after the PCIe controller initiates a speed change (e.g., to the Gen 3 data rate), 210, the receiver circuits go through a first acquisition sequence (ACQ), 215. The receiver attempts bit lock during ACQ 215, concurrently converging clock and data recovery loop (CDR), automatic gain control (AGC), decision feedback equalization (DFE) and continuous offset cancellation (CTOC). When ACQ 215 completes, the receiver achieves the best operating condition given the default link partner's transmitter equalization and receiver CTLE peak settings.

In one embodiment, adaptive equalization starts at the end of ACQ 215. In one embodiment, the overall link evaluation is performed using feed forward equalization (FFE) by looking for a gradient of over-equalization and balanced equalization. In one embodiment, the gradients of equalization are used to drive the transmitter equalization adaptation during the first half of iterations, 220, and jointly optimizes transmitter equalization (TxEQ) and receiver CTLE (Rx-CTLE) in the second half of iterations, 260.

In one embodiment, FFE is used to calculate the new TxEQ and RxCTLE coefficients and communicate these new values to the system agent. The system agent can then communicate these new settings with the link partner and wait for new values to be effective during the SA segment. In one embodiment, adaptive equalization can then be performed for a preselected number of iterations to ensure that the TxEQ and RxCTLE eventually reach optimal settings. In PCIe, for example, 24 ms is the maximum training time and the process described herein can be accomplished in 1.5 ms or less, which significantly improves system performance.

Figure 3:
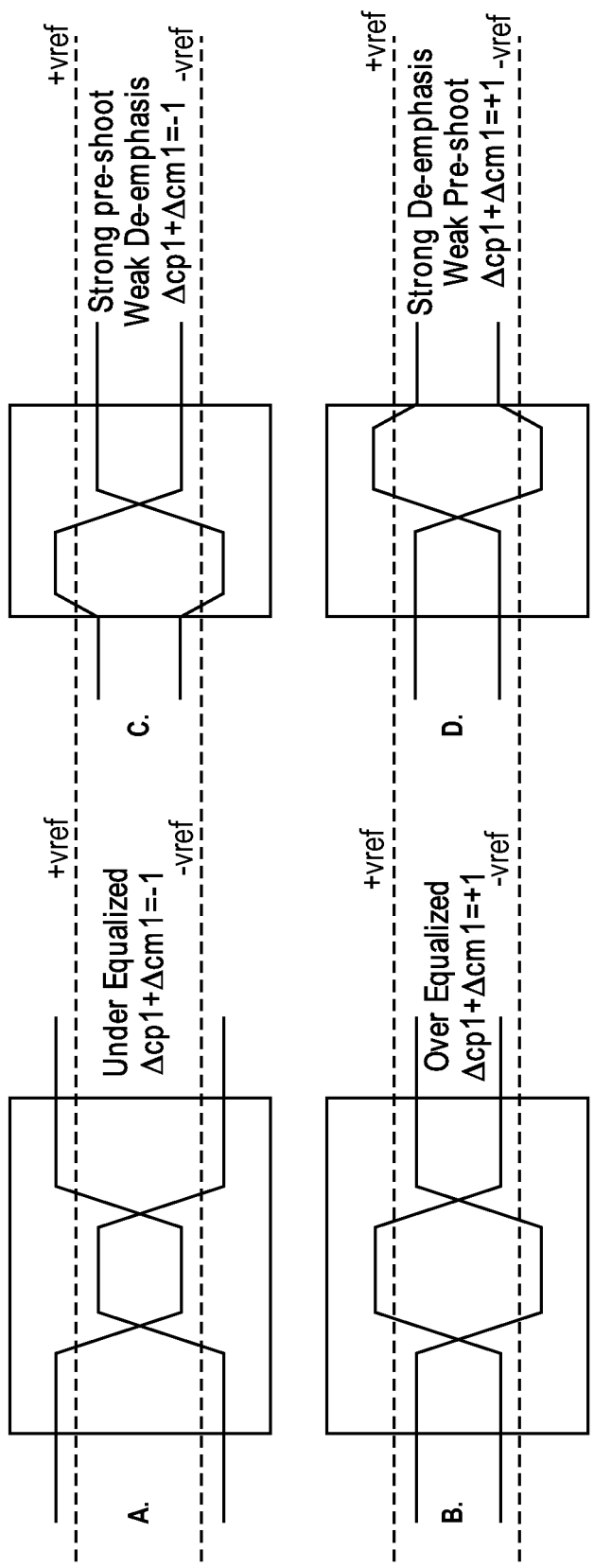
FIG. 3 illustrates data patterns for analysis in one embodiment of an adaptive equalization process.

FIG. 3 illustrates data patterns for analysis in one embodiment of an adaptive equalization process. In one embodiment, data patterns "x101x" and "x010x" are analyzed at the DFE error samplers to search for indications of total equalization. In one embodiment, the middle of the three bits is the sampled bit that is compared and used for the adaptive equalization process. In one embodiment, the sampled bit is compared against reference voltages (+vref, −vref).

In one embodiment, if the single transition bit in the center is below the convergence reference voltages while the non-transition bits are above the reference voltage, it is considered under-equalized, as illustrated in FIG. 3A. In one embodiment, the formula $\Delta cp1+\Delta cm1=-1$ is used to represent under-equalization. In one embodiment, if the single transition bit in the center is greater than the convergence reference voltages while the non-transition bits are below the reference voltage, it is considered over-equalized, as illustrated in FIG. 3B. In one embodiment, the formula $\Delta cp1+\Delta cm1=+1$ is used to represent over-equalization. During the adaptive equalization process, the variable "TEQ" is used such that TEQ=+1 if over-equalized and TEQ=−1 if under-equalized, and TEQ=0 for leveled equalization.

In one embodiment, data patterns "x1100x" and "x0011x" are analyzed by the DFE error samplers to search for indications of balanced equalization. The voltage amplitudes of the two center bits are compared against the convergence reference voltages. In one embodiment, if the first bit in the center exceeds the convergence reference voltage while the second bit is below the reference voltage, it is considered "pre-shoot overweight," which is illustrated in FIG. 3C. In one embodiment, if the first bit in the center is below the convergence reference voltage while the second bit is above the reference voltage, it is considered "de-emphasis overweight," which is illustrated in FIG. 3D. During the adaptive equalization process, the variable "BEQ" is used such that BEQ=+1 if de-emphasis overweight and BEQ=−1 if pre-shoot overweight, and BEQ=0 if equalization is balanced.

Figure 4:
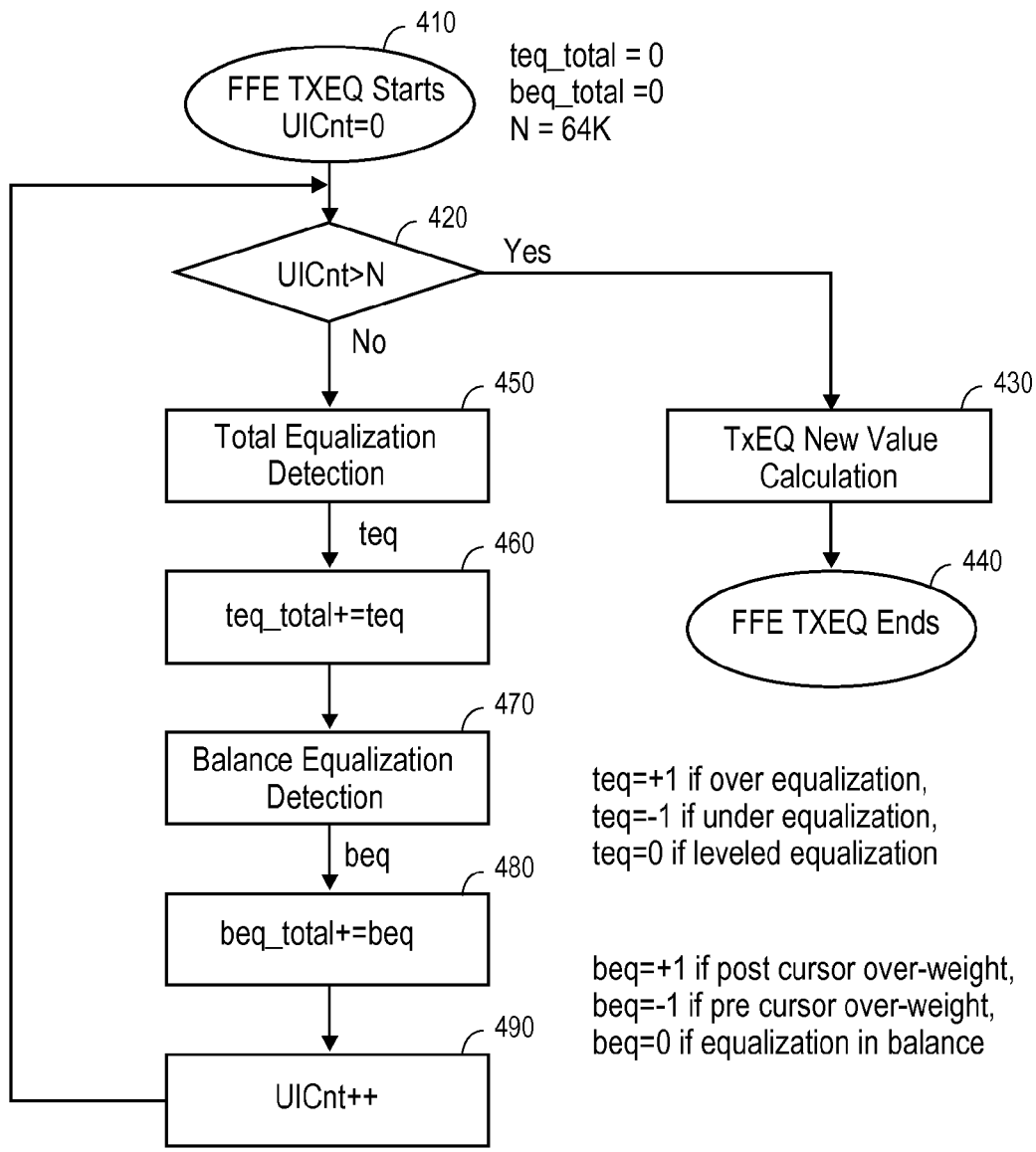
FIG. 4 is a flow diagram of an example technique for calculating balance equalization and total equalization.

In one embodiment, during the FFE training segment (e.g., a 64 k UI time window), in which input bit streams are sampled and filtered through the data pattern analysis to collect TEQ and BEQ statistics. An example flow chart for total TEQ and BEQ calculation is illustrated in FIG. 4. The example of FIG. 4 is for a training window of 64 k UI; however, other training windows that are either longer or shorter can also be supported.

The FFE TxEQ training segment starts, 410, with The UI count at zero. If the UI count is greater than the designated window (e.g., 64 k), 420, a new TxEQ value calculation is performed, 430 and the FFE TxEQ training segment ends, 440. If the UI count is not greater than the designated window, 420, total equalization (TEQ) detection is performed, 450. In one embodiment, TEQ detection is performed as described above. The detected TEQ value is added to the total TEQ (teq_total), 460.

Balance equalization (BEQ) is then performed, 470. In one embodiment, BEQ detection is performed as described above. The detected BEQ value is added to the total BEQ (beq_total), 480. The UI count is incremented, 490, and the process is repeated.

Once the total TEQ and total BEQ values are calculated, the new TxEQ values can be calculated. In the description that follows, $\Delta cp1$ represents the TxEQ de-emphasis coefficient change, $\Delta cm1$ represents the TxEQ pre-shoot coefficient change and $+\Delta c0$ represents the main tap change. In one embodiment, the following equations are utilized:

$$\begin{cases} \Delta 1 = \text{sign}(teq\_total) \\ \Delta 2 = \text{sign}(beq\_total) \\ \Delta cp1 + \Delta cm1 = \Delta 1 \\ \Delta cp1 - \Delta cm1 = \Delta 2 \end{cases} \rightarrow \begin{cases} \Delta cp1 = \text{sign}(\Delta 1 + \Delta 2) \\ \Delta cm1 = \text{sign}(\Delta 1 - \Delta 2) \\ \Delta c0 = -(\Delta cp1 + \Delta cm1) \end{cases}$$

In one embodiment, if boundary conditions, including full swing (FS) level, low frequency (LF) level, and coefficient polarity are met, $\Delta cm1$, $\Delta c0$ and $\Delta cp1$ are added to the current TxEQ to calculate the new values. If boundary conditions are not met, $\Delta cm1$, $\Delta c0$ and $\Delta cp1$ are applied subject to the boundary conditions.

In one embodiment, in the second half of the adaptive iterations (as illustrated in FIG. 2), FFE can be utilized to jointly optimize TxEQ and RxCTLE. In one embodiment CTLE is an analog circuit having characteristics that are process, voltage and temperature (PVT) dependent. It can also be subject to part-to-part variation.

In one embodiment, an example of a numeric peak index 0-15 is assigned to represent the extent of CTLE equalization. 0 represents flat band response, or no equalization; 1 represents a slight increase in equalization; and 15 represents the largest amount of equalization. The numeric index is just an example, other parameterization can be applied following the same principle.

Typically, higher peak settings for the CTLE results in expanding the equalization pulse to the subsequent UI, which can cause over equalization in short and medium channels. A common symptom is low (or negative) DFE values which tries to correct for an excessive EQ pulse coming from the CTLE.

Margin and link stability issues can arise when DFEs work too hard to cancel the over-equalization caused by the CTLE. In some situations CTLE peaking of zero is sufficient when the DFE can handle the inter-symbol interference (ISI) alone. CTLE can improve link performance in long channels where ISI is significant.

In one embodiment, CTLE adaptation can be controlled by the AGC and DFE loop. In one embodiment, CTLE adaptation begins after the first phase of TxEQ iterations (See FIG. 2) with the initial Peak=0. For the following, $\Delta$peak represents the CTLE peak value change and the following can be used for CTLE adaptation.

$\Delta$peak=+1 when DFE first tap exceeds 50% of operating capacity, which indicates significant ISI;

$\Delta$peak=−1 when DFE second tap is in the opposite direction of the first tap and exceeds 50% of the first tap magnitude, which indicates CTLE over equalization; and $\Delta$peak is applied subject to boundary conditions of AGC saturation and CTLE peak ranges.

The operating capacity is a programmable value which represents a reasonable range for the decision feedback equalizer across a set of channel conditions.

Figure 5:
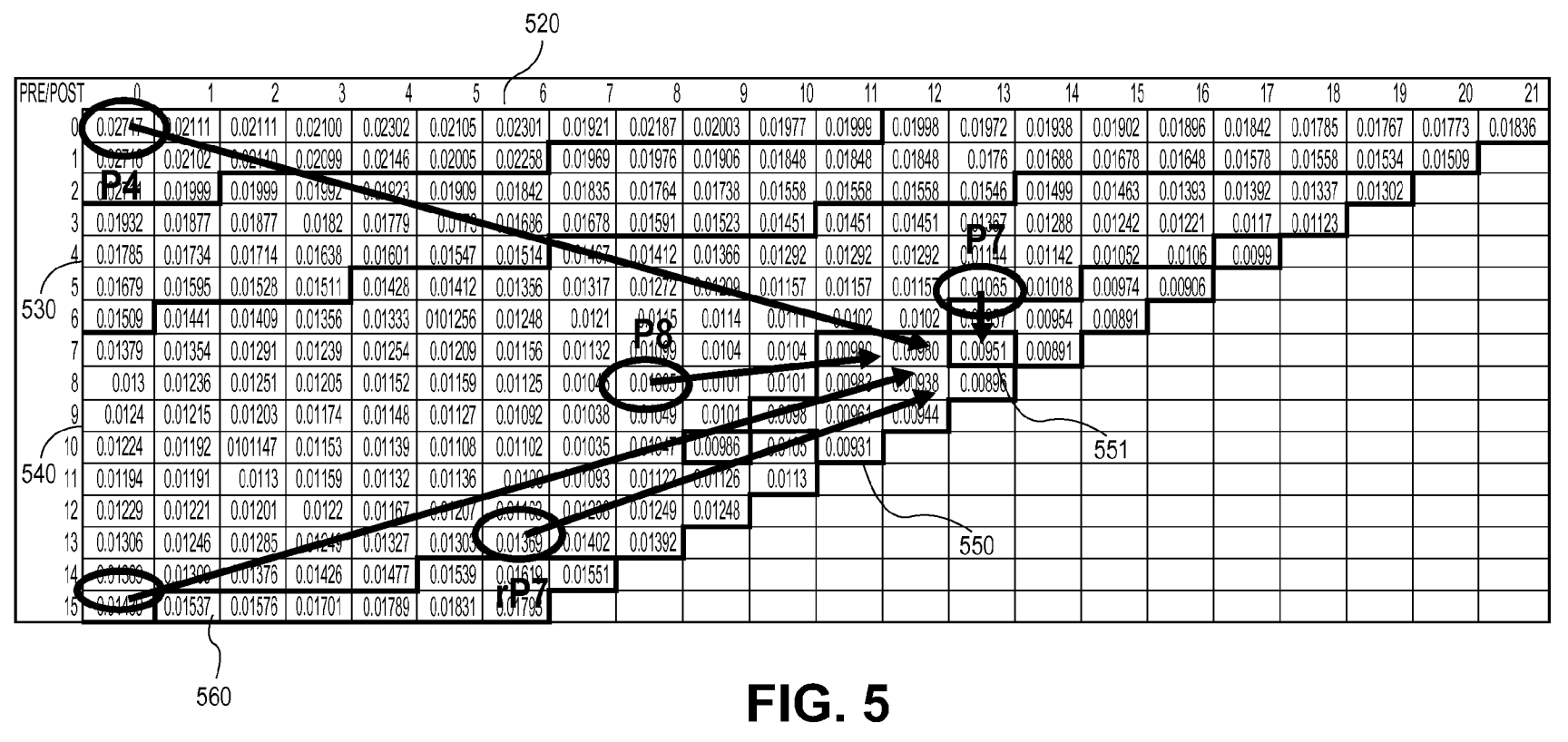

FIG. 5 is an example equalization map. Presets P4, P7, reversed P7 (rP7) and P8 represent example initial TxEQ settings for the adaptive equalization process. The equalization map of FIG. 5 is a figure of merit on receiver margin for all combinations of link partner TxEQ coefficients. The horizontal axis is the TxEQ post-cursor value and the vertical axis is the pre-cursor value. For each pair of post-cursor and pre-cursor value, the receiver margin is measured in terms of mean-squared-error (MSE) of the DFE outputs at the sampling instances with respect to a reference voltage (e.g., vref).

In the example of FIG. 5, cells in group 520 are TxEQ settings with final MSE values that are excessively too high, cells in groups 530 and 560 are TxEQ settings with final MSE values that are moderately high, cells in group 540 are TxEQ settings with final MSE values that are acceptable, but not optimal, and cells in group 550 are TxEQ settings with final MSE values that are desirable. In one embodiment, the adaptive equalization process converges to the same cells 551 within group 550 from different starting TxEQ settings including P4, P7, reversed P7 (rP7) and P8.

Figure 6:
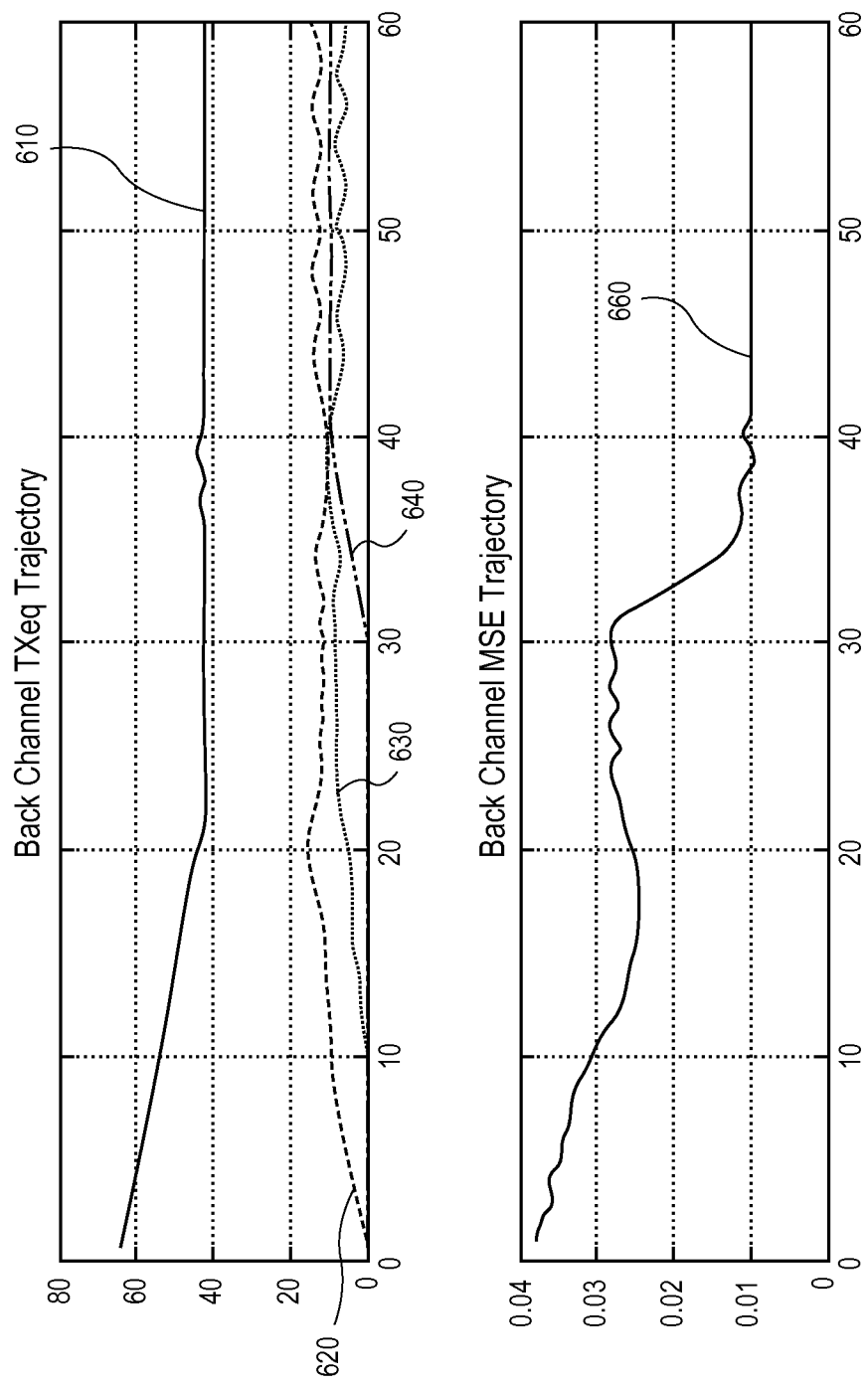
FIG. 6 illustrates a convergence trajectory of a transmitter equalization and receiver continuous time linear equalizer (CTLE) peaking adjustment of an embodiment utilizing the adaptive backchannel equalization.

The convergence trajectories starting from TxEQ preset P4 in the example are shown in FIG. 6. For PCIe Gen3 backchannel equalization, for example, 60 iterations can be run in which the first 30 iterations adjust link partner TxEQ with receiver CTLEPeak set to 0, and the last 30 iterations perform TxEQ and RxCTLE joint optimization. Other numbers of iterations that are either greater than or less than 60 can also be used. Curve 610 illustrates the trajectory of TxEQ C0 convergence, curve 630 illustrates the trajectory of TxEQ Cm1 convergence, curve 620 illustrates the trajectory of TxEQ Cp1 convergence, and line 640 illustrates the trajectory of CTLEPeak convergence. The MSE improvement 660 is also plotted for comparison purpose.

In one embodiment, the adaptive equalization can start from different initial TxEQ settings including P7, P4, P8, reversed P7. In one embodiment, the initial receiver CTLE-Peak is fixed at 0. In one embodiment, the final converged TxEQ coefficients and receiver CTLEPeak are the same for the different initial settings. Under typical condition, 60 iterations take about 1.5 mS, well below the specified 24 mS training window required by the PCIe Gen3 specification.

As discussed above, the techniques described herein can be utilized within a PCI or PCIe architecture. One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
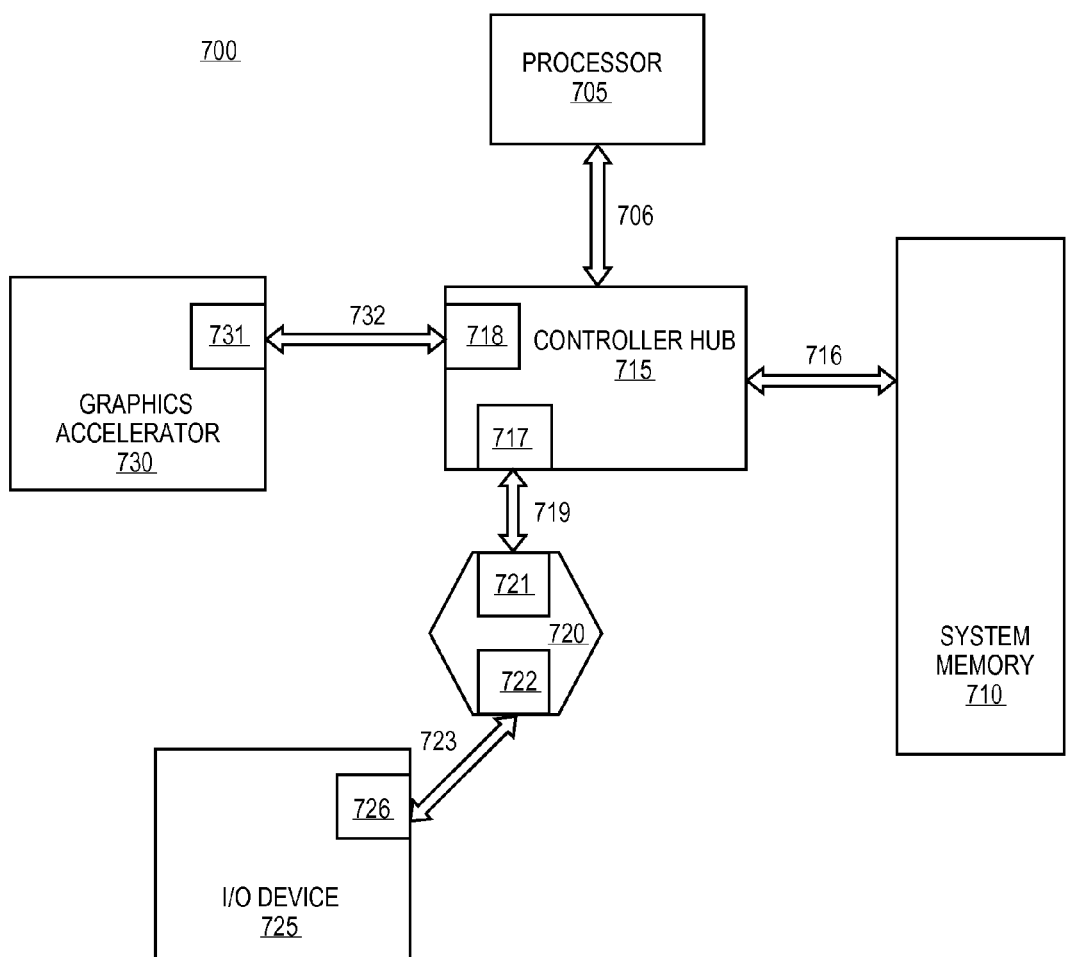
FIG. 7 illustrates an embodiment of a computing system including a peripheral component interconnect express (PCIe) compliant architecture.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
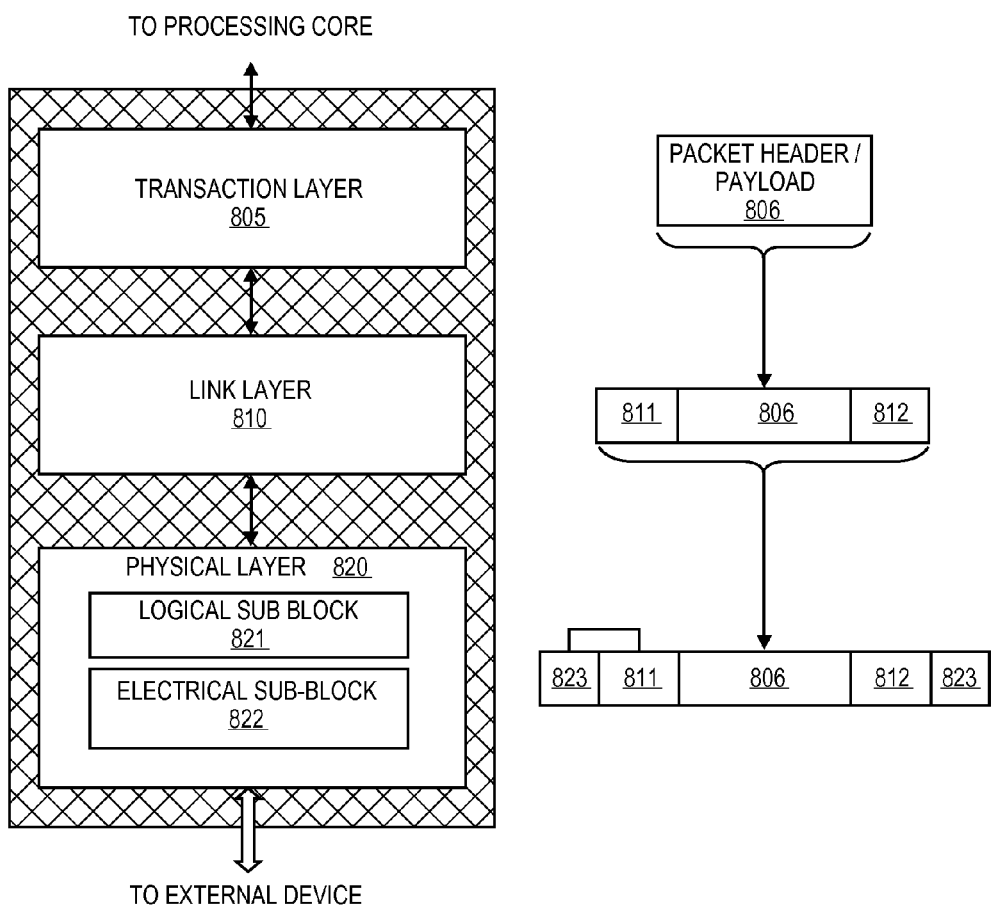
FIG. 8 illustrates an embodiment of a PCIe compliant interconnect architecture including a layered stack.

Turning to FIG. 8 an embodiment of a layered protocol stack is illustrated. Layered protocol stack 800 includes any form of a layered communication stack, such as a Quick Path Interconnect (QPI) stack, a PCie stack, a next generation high performance computing interconnect stack, or other layered stack. Although the discussion below is in relation to a PCIe stack, the same concepts may be applied to other interconnect stacks. In one embodiment, protocol stack 800 is a PCIe protocol stack including transaction layer 805, link layer 810, and physical layer 820. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 115 in FIG. 8, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
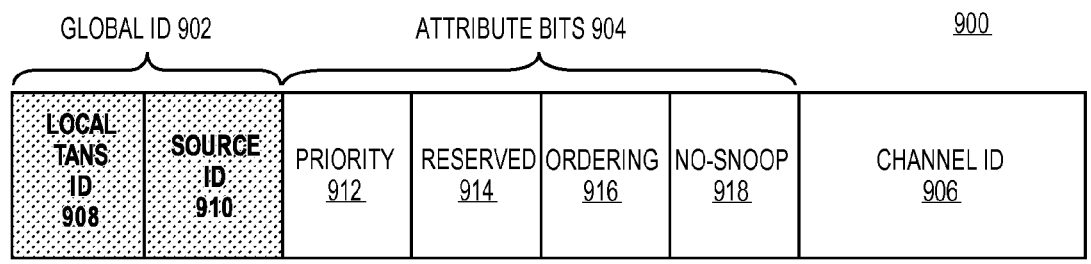
FIG. 9 illustrates an embodiment of a PCIe compliant request or packet to be generated or received within an interconnect architecture.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 704 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Figure 10:
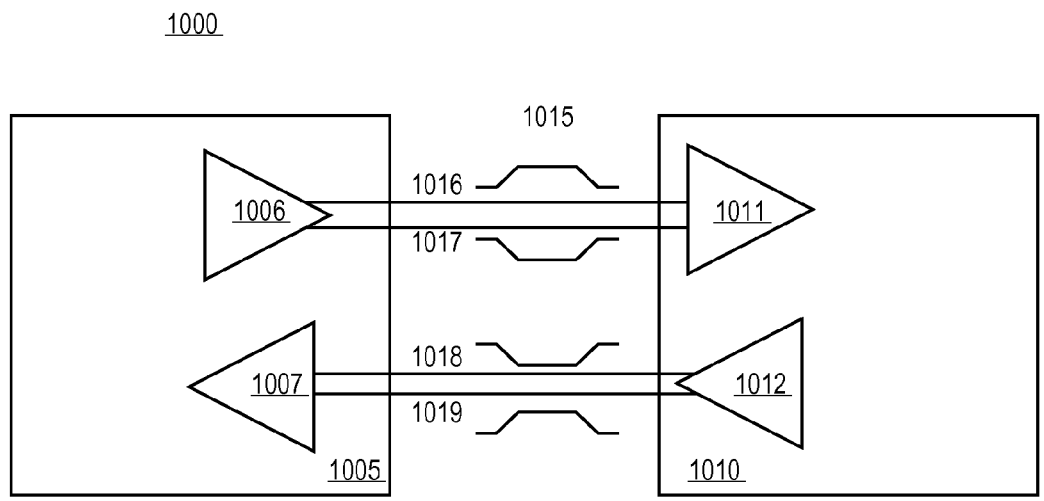
FIG. 10 illustrates an embodiment of a transmitter and receiver pair for a PCIe compliant interconnect architecture.

FIG. 10 illustrates an embodiment of a transmitter and receiver pair for a PCIe compliant interconnect architecture. Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is de-serialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
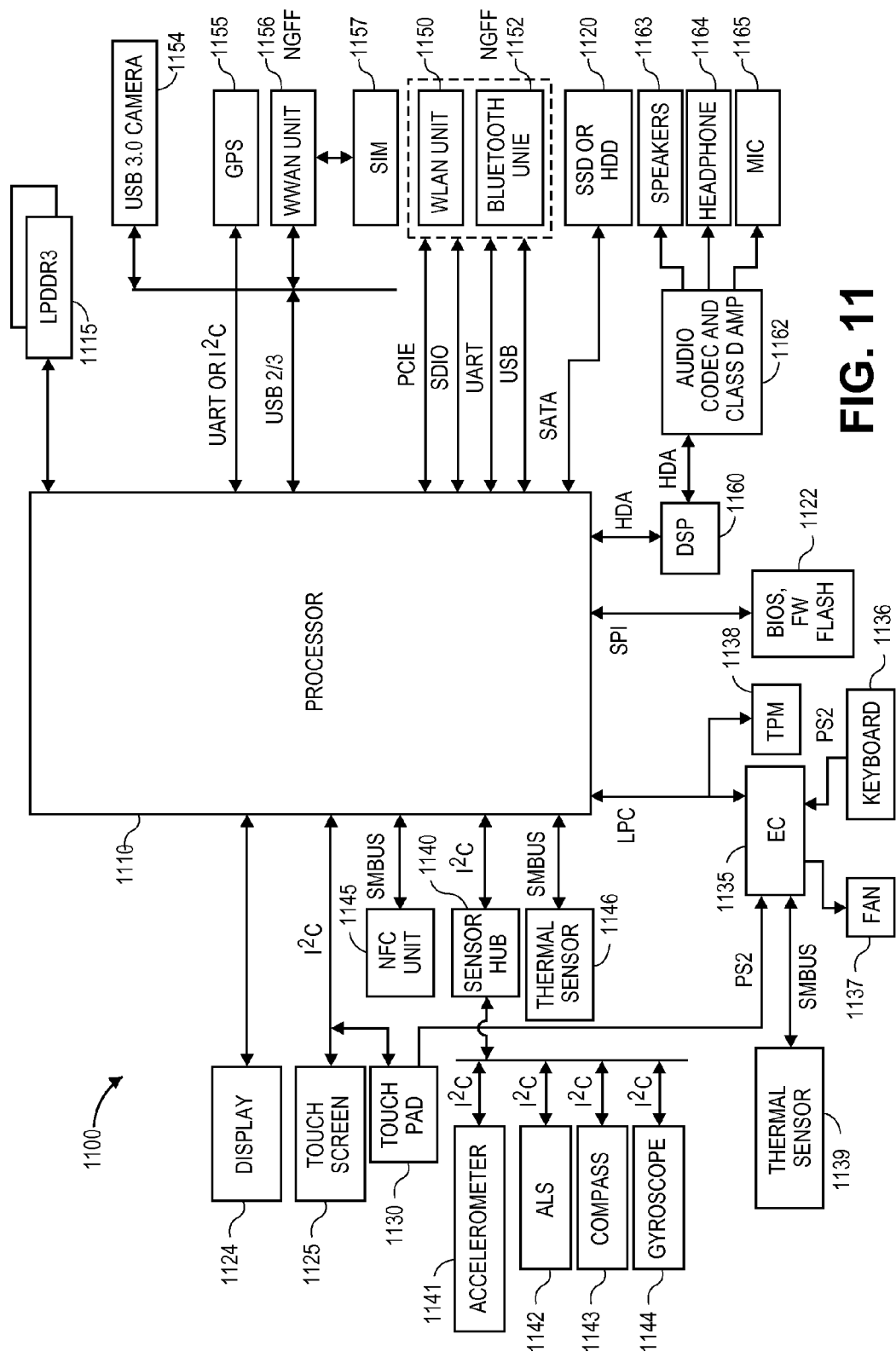
FIG. 11 illustrates an embodiment of a block diagram for a computing system.

Referring now to FIG. 11, a block diagram of components present in a computer system in accordance with an embodiment of the present invention is illustrated. As shown in FIG. 11, system 1100 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 11 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 11, a processor 1110, in one embodiment, includes a microprocessor, multi-core processor, multi-threaded processor, an ultra low voltage processor, an embedded processor, or other known processing element. In the illustrated implementation, processor 1110 acts as a main processing unit and central hub for communication with many of the various components of the system 1100. As one example, processor 1100 is implemented as a system on a chip (SoC). As a specific illustrative example, processor 1110 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1110 in one implementation will be discussed further below to provide an illustrative example.

Processor 1110, in one embodiment, communicates with a system memory 1115. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1120 may also couple to processor 1110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1122 may be coupled to processor 1110, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1100. Specifically shown in the embodiment of FIG. 11 is a display 1124 which may be a high definition LCD or LED panel configured within a lid portion of the chassis. This display panel may also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 may be coupled to processor 1110 via a display interconnect that can be implemented as a high performance graphics interconnect. Touch screen 1125 may be coupled to processor 1110 via another interconnect, which in an embodiment can be an I²C interconnect. As further shown in FIG. 11, in addition to touch screen 1125, user input by way of touch can also occur via a touch pad 1130 which may be configured within the chassis and may also be coupled to the same I²C interconnect as touch screen 1125.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1110 in different manners. Certain inertial and environmental sensors may couple to processor 1110 through a sensor hub 1140, e.g., via an I²C interconnect. In the embodiment shown in FIG. 11, these sensors may include an accelerometer 1141, an ambient light sensor (ALS) 1142, a compass 1143 and a gyroscope 1144. Other environmental sensors may include one or more thermal sensors 1146 which in some embodiments couple to processor 1110 via a system management bus (SMBus) bus.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

Also seen in FIG. 11, various peripheral devices may couple to processor 1110 via a low pin count (LPC) interconnect. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 may also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, may also couple to processor 1110 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1100 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a near field communication (NFC) unit 1145 which may communicate, in one embodiment with processor 1110 via an SMBus. Note that via this NFC unit 1145, devices in close proximity to each other can communicate. For example, a user can enable system 1100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 11, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth unit 1152, short range communications via a Bluetooth protocol can occur. These units may communicate with processor 1110 via, e.g., a USB link or a universal asynchronous receiver transmitter (UART) link. Or these units may couple to processor 1110 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1156 which in turn may couple to a subscriber identity module (SIM) 1157. In addition, to enable receipt and use of location information, a GPS module 1155 may also be present. Note that in the embodiment shown in FIG. 11, WWAN unit 1156 and an integrated capture device such as a camera module 1154 may communicate via a given USB protocol such as a USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC)

and amplifier 1162 that in turn may couple to output speakers 1163 which may be implemented within the chassis. Similarly, amplifier and CODEC 1162 can be coupled to receive audio inputs from a microphone 1165 which in an embodiment can be implemented via dual array microphones (such as a digital microphone array) to provide for high quality audio inputs to enable voice-activated control of various operations within the system. Note also that audio outputs can be provided from amplifier/CODEC 1162 to a headphone jack 1164. Although shown with these particular components in the embodiment of FIG. 11, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1110 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1135. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1135 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 11, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 12:
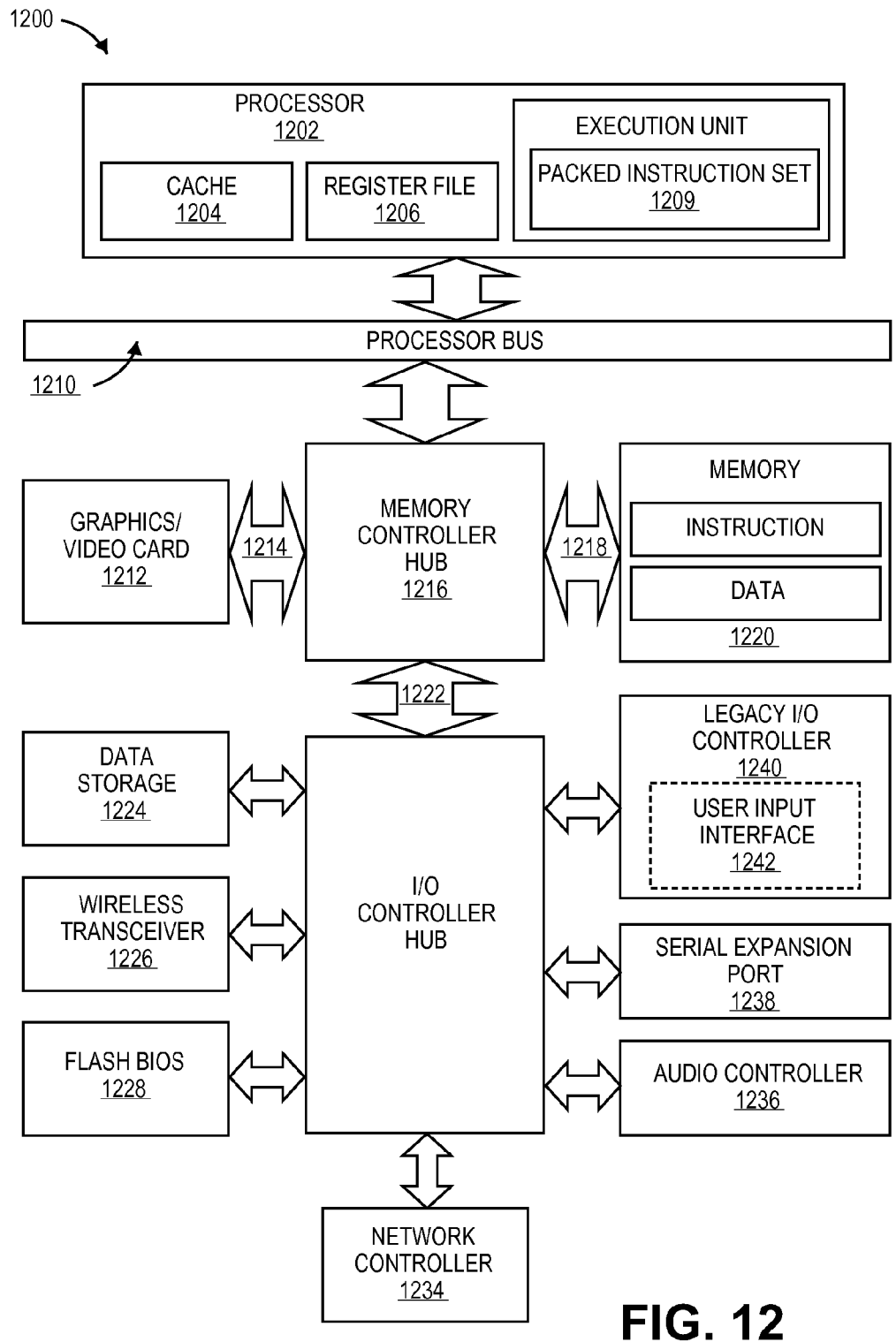
FIG. 12 illustrates another embodiment of a block for a computing system.

Turning to FIG. 12, a block diagram of an exemplary computer system formed with a processor that includes execution units to execute an instruction, where one or more of the interconnects implement one or more features in accordance with one embodiment of the present invention is illustrated. System 1200 includes a component, such as a processor 1202 to employ execution units including logic to perform algorithms for process data, in accordance with the present invention, such as in the embodiment described herein. System 1200 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1202 includes one or more execution units 1208 to implement an algorithm that is to perform at least one instruction. One embodiment may be described in the context of a single processor desktop or server system, but alternative embodiments may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one embodiment, the processor 1202 includes a Level 1 (L1) internal cache memory 1204. Depending on the architecture, the processor 1202 may have a single internal cache or multiple levels of internal caches. Other embodiments include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1202. For one embodiment, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

Note that any of the aforementioned features or aspects of the invention may be utilized on one or more interconnect illustrated in FIG. 12. For example, an on-die interconnect (ODI), which is not shown, for coupling internal units of processor 1202 implements one or more aspects of the invention described above. Or the invention is associated with a processor bus 1210 (e.g. Intel Quick Path Interconnect (QPI) or other known high performance computing interconnect), a high bandwidth memory path 1218 to memory 1220, a point-to-point link to graphics accelerator 1212 (e.g. a Peripheral Component Interconnect express (PCIe) compliant fabric), a controller hub interconnect 1222, an I/O or other interconnect (e.g. USB, PCI, PCIe) for coupling the other illustrated components. Some examples of such components include the audio controller 1236, firmware hub (flash BIOS) 1228, wireless transceiver 1226, data storage 1224, legacy I/O controller 1210 containing user input and keyboard interfaces 1242, a serial expansion port 1238 such as Universal Serial Bus (USB), and a network controller 1234. The data storage device 1224 can comprise a hard disk drive, a floppy disk drive, a CD-ROM device, a flash memory device, or other mass storage device.

Figure 13:
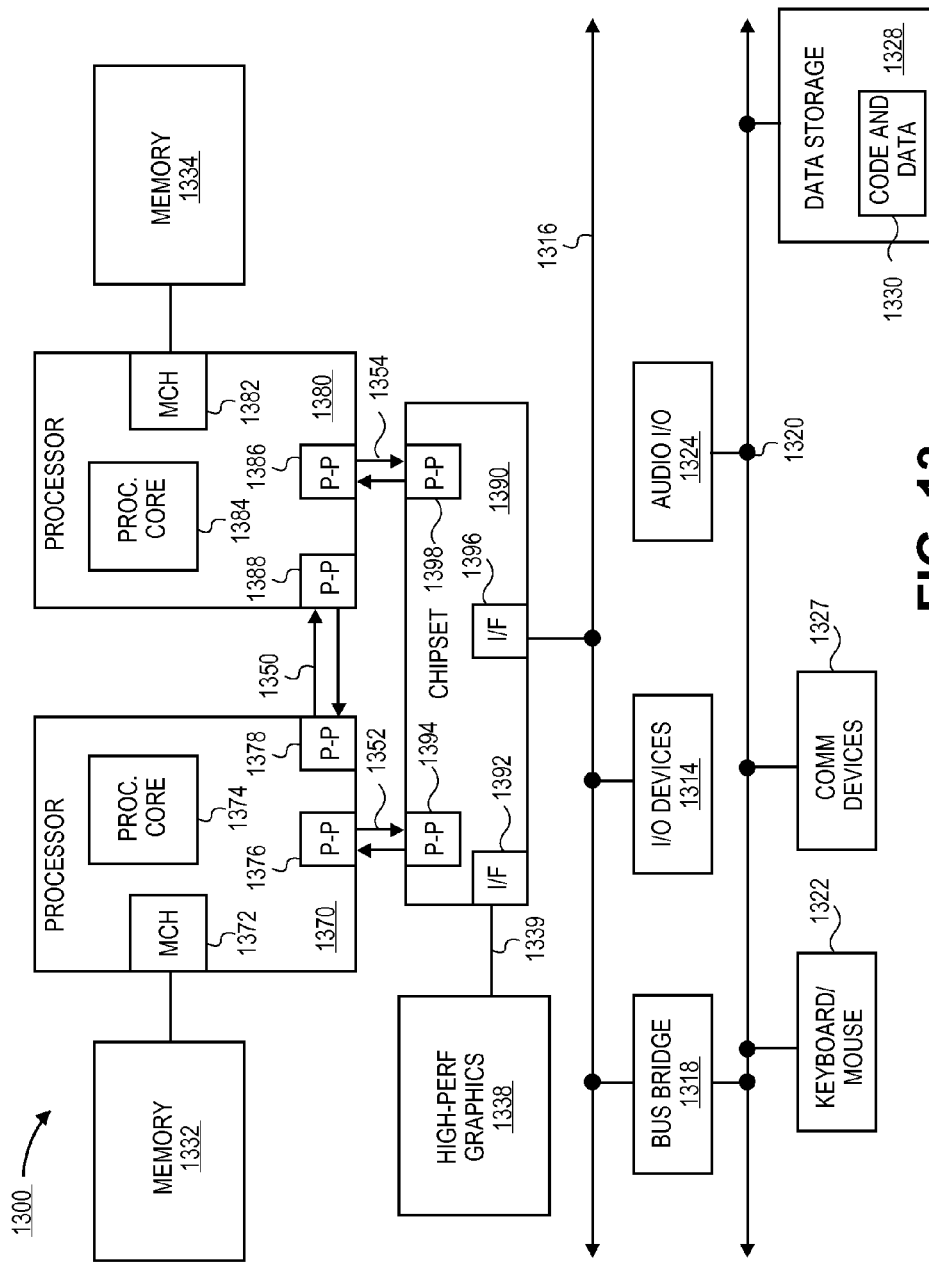
FIG. 13 illustrates another embodiment of a block diagram for a computing system.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. At least one non-transitory machine accessible storage medium having code stored thereon, the code when executed on a machine, causes the machine to:
   determine a continuous time linear equalizer (CTLE) peak setting of a receiver, wherein the receiver is coupled to a transmitter by a serial link; and
   transmit data over the serial link based on the transmitter equalization coefficient and the CTLE peak setting,
   wherein determining the continuous time linear equalizer (CTLE) peak setting comprises determining a continuous time linear equalizer (CTLE) peak value change by:
   increasing the CTLE peak value if a first decision feedback equalizer (DFE) tap exceeds a first preselected percentage of maximum capacity; and
   decreasing the CTLE peak value if a second DFE tap has an opposite magnitude as the first DFE tap and exceeds a second preselected percentage of the first DFE first tap magnitude.

2. The storage medium of claim 1, wherein the code, when executed, further causes the machine to determine a total equalization value over a training period.

3. The storage medium of claim 2, wherein the code, when executed, further causes the machine to determine a total balance equalization value over the preselected training period.

4. The storage medium of claim 3, wherein the code, when executed, further causes the machine to determine a transmitter equalization coefficient of a transmitter based on the total equalization value and the total balance equalization value.

5. The storage medium of claim 3, wherein determining a balance equalization value over a preselected training period comprises:
   for each interval within the preselected training period determining a balance equalization detection value for the interval; and
   summing the balance equalization value for multiple intervals to determine the balance equalization value over the preselected training period.

6. The storage medium of claim 5, wherein the balance equalization detection value for the interval is a positive value if a first center bit of two center bits in a multi-bit pattern exceeds a reference voltage value and a second center bit of the two center bits is less than the reference voltage.

7. The storage medium of claim 5, wherein the balance equalization detection value for the interval is a negative value if a first center bit of two center bits in a multi-bit pattern is less than a reference voltage value and a second center bit of the two center bits exceeds the reference voltage.

8. The storage medium of claim 1, wherein the first preselected percentage and the second preselected percentage are programmable.

9. The storage medium of claim 1, wherein the serial link comprises a Peripheral Component Interconnect (PCI) compliant link.

10. The storage medium of claim 9, wherein the PCI compliant link comprises a PCI express (PCIe), third generation or greater compliant link.

11. A method comprising:
    determining a continuous time linear equalizer (CTLE) peak setting of a receiver, wherein the receiver is coupled to a transmitter by a serial link; and
    transmitting data over the serial link based on the transmitter equalization coefficient and the CTLE peak setting,
    wherein determining the continuous time linear equalizer (CTLE) peak setting comprises determining a continuous time linear equalizer (CTLE) peak value change by:
    increasing the CTLE peak value if a first decision feedback equalizer (DFE) tap exceeds a first preselected percentage of maximum capacity; and
    decreasing the CTLE peak value if a second DFE tap has an opposite magnitude as the first DFE tap and exceeds a second preselected percentage of the first DFE first tap magnitude.

12. The method of claim 11, further comprising determining a total equalization value over a training period.

13. The method of claim 12, further comprising determining a total balance equalization value over the preselected training period.

14. The method of claim 13, further comprising determining a transmitter equalization coefficient of a transmitter based on the total equalization value and the total balance equalization value.

15. The method of claim 14, wherein the transmitter equalization coefficient is determined by detecting total equalization and balance equalization and further determining a transmitter equalization coefficient de-emphasis coefficient change ($\Delta cp1$), a transmitter equalization coefficient pre-shoot coefficient change ($\Delta cm1$), and a main tap change value ($\Delta c0$) using equations:

$$\begin{cases} \Delta 1 = \text{sign}(teq\_total) \\ \Delta 2 = \text{sign}(beq\_total) \\ \Delta cp1 + \Delta cm1 = \Delta 1 \\ \Delta cp1 - \Delta cm1 = \Delta 2 \end{cases} \rightarrow \begin{cases} \Delta cp1 = \text{sign}(\Delta 1 + \Delta 2) \\ \Delta cm1 = \text{sign}(\Delta 1 - \Delta 2) \\ \Delta c0 = -(\Delta cp1 + \Delta cm1) \end{cases}$$

wherein teq_total comprises a total equalization value and beq_total comprises a balance equalization value.

16. The method of claim 13, wherein determining a balance equalization value over a preselected training period comprises:
for each interval within the preselected training period determining a balance equalization detection value for the interval; and
summing the balance equalization value for multiple intervals to determine the balance equalization value over the preselected training period.

17. The method of claim 11, wherein the first preselected percentage and the second preselected percentage are programmable.

18. An apparatus comprising:
a feed forward equalizer module to:
determine a continuous time linear equalizer (CTLE) peak setting of a receiver, by determining a continuous time linear equalizer (CTLE) peak value change, wherein determining the CTLE peak value change comprises:
increasing the CTLE peak value if a first decision feedback equalizer (DFE) tap exceeds a first preselected percentage of maximum capacity; and
decreasing the CTLE peak value if a second DFE tap has an opposite magnitude as the first DFE tap and exceeds a second preselected percentage of the first DFE first tap magnitude; and
a link controller to cause data to be transmitted over a serial link based at least in part on the CTLE peak setting.

19. The apparatus of claim 18, wherein the feed forward equalizer module is further to:
determine a total equalization value over a training period,
determine a total balance equalization value over the preselected training period, and
determine a transmitter equalization coefficient of a transmitter based on the total equalization value and the total balance equalization value.

20. The apparatus of claim 19, wherein the link controller causes data to be transmitted over the serial link further based on the total balance equalization value.

* * * * *